(No Model.) 3 Sheets—Sheet 1.

W. H. KNIGHT.
ELECTRIC MOTOR FOR RAILWAYS.

No. 354,793. Patented Dec. 21, 1886.

Witnesses
Albert E. Lynch
Wm. H. Monroe

Inventor
Walter H. Knight
by Brittey & Knight
attys.

(No Model.)  3 Sheets—Sheet 2.

W. H. KNIGHT.
ELECTRIC MOTOR FOR RAILWAYS.

No. 354,793.  Patented Dec. 21, 1886.

Witnesses
Albert E. Lynch
Wm. M. Monroe

Inventor
Walter H. Knight
by Brattey & Knight
attys

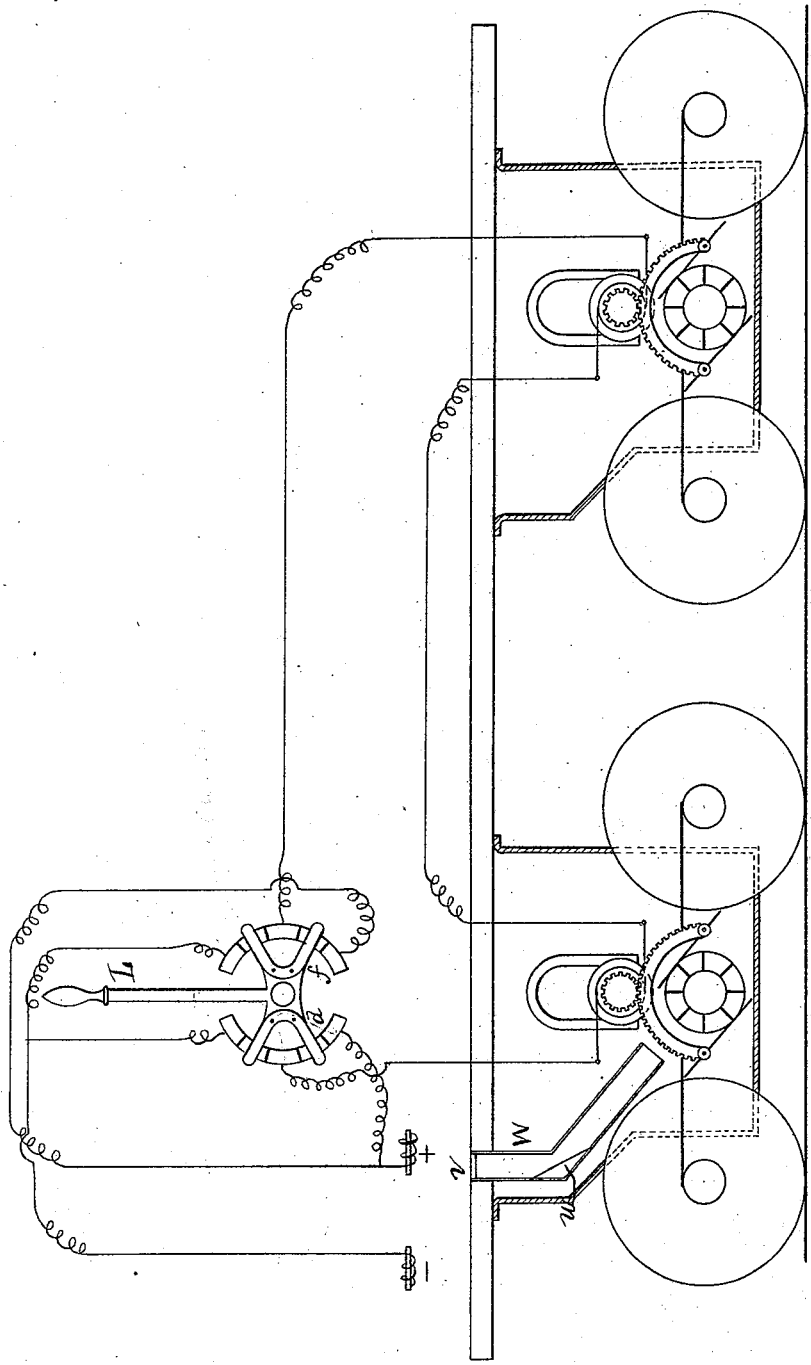

UNITED STATES PATENT OFFICE.

WALTER H. KNIGHT, OF CLEVELAND, OHIO.

ELECTRIC MOTOR FOR RAILWAYS.

SPECIFICATION forming part of Letters Patent No. 354,793, dated December 21, 1886.

Application filed May 11, 1885. Serial No. 165,100. (No model.)

*To all whom it may concern:*

Be it known that I, WALTER H. KNIGHT, a citizen of the United States, and a resident of Cleveland, Ohio, have invented certain new and useful Improvements in Electric Motors for Railways, of which the following is a specification.

My invention consists in the combination of two electric motors in the same circuit and connected to a common load, the motors each having means for shifting their commutator-brushes and a common device for actuating said means.

It further consists in the application of two motors so combined to an electric railway.

Figure 1:
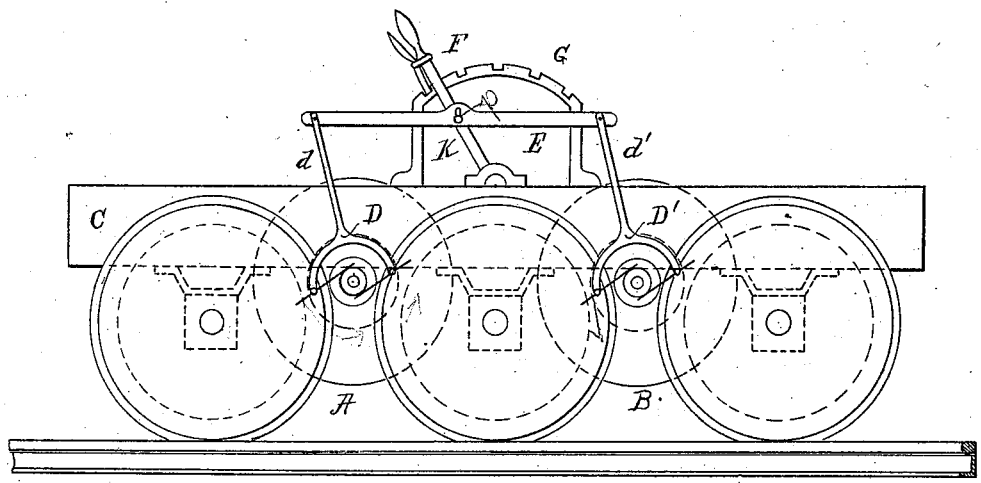
Figure 2:
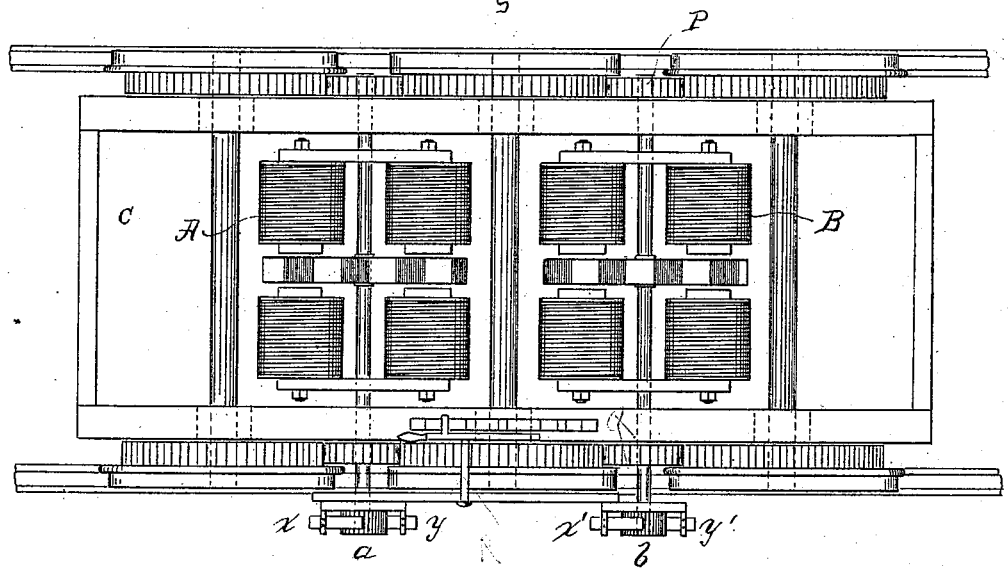

In the accompanying drawings, Figures 1 and 2 illustrate the invention as applied to an electric locomotive. Figs. 3, 4, 5, and 6 illustrate the invention when the two motors are upon separate trucks of a car or train. Fig. 1 shows a six-wheeled electric locomotive, the three axles being rigidly journaled in frame C.

A and B are two electric motors suspended between the axles, and having their armature-shafts also rigidly journaled in frame C. Upon each armature-shaft are two pinions, P, meshing with gear-wheels on the axles, so that the two motors when in action will co-operate in giving rotation to the locomotive-wheels and propelling it. $a$ and $b$ are the respective commutators of the two motors, and $x y$ and $x' y'$ are the brushes. The brushes are adapted to be moved around the commutator in any of the well-known ways. In this case the brush-holders D D' are adapted to be shifted in either direction by means of levers $d\ d'$, which are connected at their upper ends by cross-bar E. Through a vertical slot in E projects a pin, $p$, from hand-lever F, which moves over a notched segment, G. The two motors will be both connected in circuit with the main conductors of the railway in any of the well-known ways, and I have found that both sets of brushes may be so adjusted as to be simultaneously moved by a common lever and both kept at the point of least sparking and both motors be controlled at will, independently of the circuit through them.

Instead of both motors being combined in a single locomotive, they may be upon separate trucks of a car or train and both be controlled from a single point.

Figure 3:
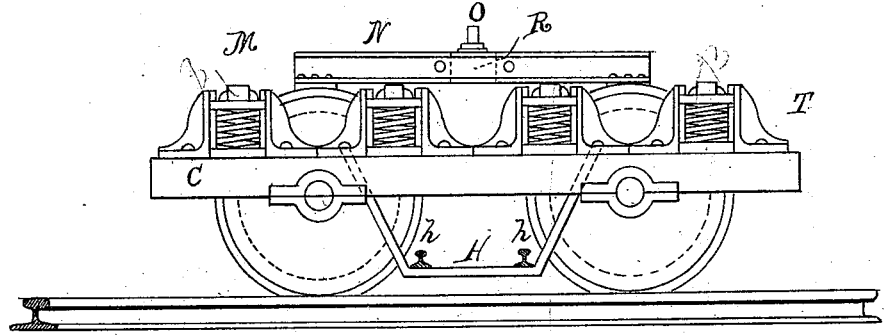
Figure 4:
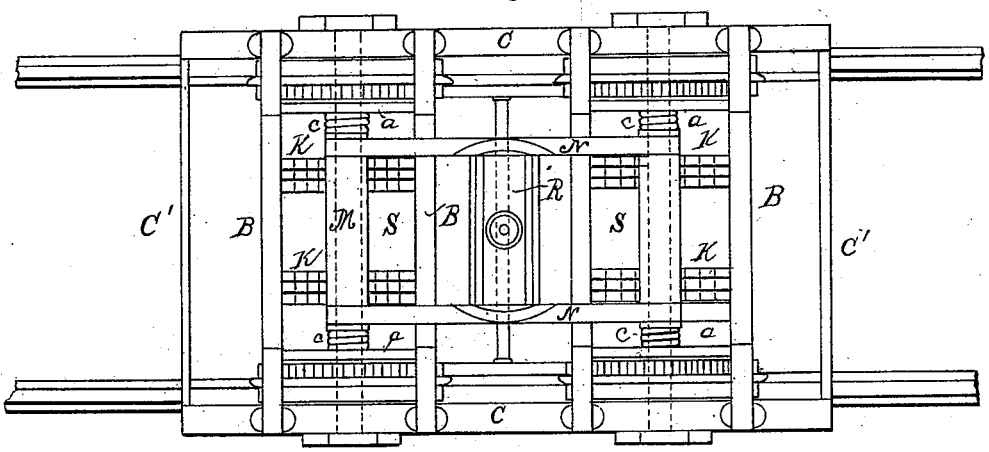
Figure 5:
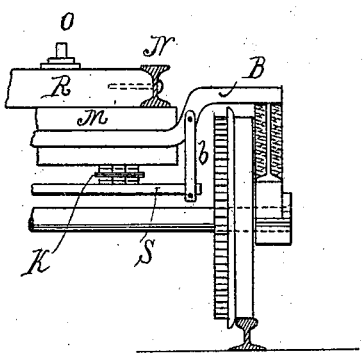

Figs. 3, 4, and 5 illustrate the construction of a swivel-truck adapted to be driven by an electric motor and to be placed under a car in the usual way.

A frame is formed by the two stringers C C and the cross-beams C' C', and the two axles are journaled rigidly in this frame. From each stringer a hanger, H, depends between the two axles upon which the motor is set, its armature-shaft being geared to the wheels, as in Figs. 1 and 2. The motor is not shown in full, in order that the construction of the truck may be clearer; but its position is indicated by the two small rails $h\ h$, which extend between the hangers H and carry the motor.

Upon each stringer C are set four coil-springs, T, one on each side of each wheel, and four cross-bars, B, extend across the truck and rest upon these springs, as is more clearly seen in Fig. 5, which is an end view with the beams C' C' left off. From these bars B are suspended by hangers $b$ the two spring-boards S, one over each axle of the car. On each spring-board are two elliptic springs, K, upon which rests the bolster carrying the king-bolt. This bolster is made up of the two I-beams N, connecting the cross-beams M, which rest directly on the springs K. A block, R, is bolted between beams N N and carries the king-bolt O. Each set of cross-bars B are fastened together by means of braces $a\ a$, and between these braces and the bolster are buffers $c\ c$, which prevent too great side swing of the latter.

By means of the arrangement just described the car-body will be supported from the truck through intermediate springs in the usual manner, while the motor and car-wheels will be rigidly connected to a common frame, so that their gearing will not be affected by the springing of the car-body.

When two or more such trucks are placed under a car or train, it will be, of course, of especial importance that their motors should have their commutator-brushes controlled from a common point. This can be done in any mechanical way; but it is more conveniently attained by electrical means, as is shown in the diagram, Fig. 6. Upon each motor I place a smaller motor having its armature geared to the brush-holder, so as to shift the brushes in one direction or the other, according to the direction of its rotation. These small motors are in series in the same circuit, which may be a branch circuit from the main conductors + and −, as is shown in the present instance. The direction of current in this circuit is controlled by lever L, which is placed at some convenient point on the car or train where the driver may be stationed. This lever L operates a pole-changer in the circuit, which is of ordinary construction, and need not be minutely described. When in its vertical position no current passes through the small motors and they remain at rest; but when it is moved a current passes of a polarity determined by the direction of movement and actuates the motors to shift the brushes in one direction or the other. Any electro-dynamic devices may be employed in lieu of the motors.

The main motors will be tightly inclosed, so as to be protected from the dirt, and in order that the driver may see the commutator of one motor it will be necessary to provide an aperture in the box inclosing the motor, which shall permit the commutator to be seen by him, and he will know that when one commutator is free from injurious sparking the others will also be in the same condition. This aperture may be directly over the motor, and is preferably covered with glass; but in some cases it will be necessary to provide a tube and reflector, so that the motor can be placed at a distance from the driver. This latter case is illustrated in Fig. 6, where a tube, W, enters the inclosing-box and leads from the commutator to the driver's station, a mirror, w, being placed in the angle of the tube, and a glass plate, v, being placed over the outer end of the tube. If the truck be movable relatively to the car-body and the driver's stand be on the latter, it is preferable that the tube be fixed to the truck and its end arranged so that observations can be taken wherever it may be relatively to the car-body.

The swivel-trucks may be constructed with three axles instead of two, another motor being added, as in Figs. 1 and 2, and the truck would not, of course, be swiveled if it were the only one on the car.

Any number of motors may, of course, be provided with a common brush-shifting device without departing from the spirit of my invention.

Having thus described my invention, I claim—

1. The combination of two electric motors in the same circuit, mechanically connected to a common load, movable commutator-brushes for each motor, and a common shifting device for said brushes.

2. The combination, with two separate trucks of a car or train, of an electric motor on each truck in the same circuit and connected to the axles of the trucks, movable commutator-brushes for each motor, and shifting devices for said brushes controlled from a common point.

3. The combination, with two swiveled trucks and a car-body supported thereon, of an electric motor on each truck connected to the axles and a common controlling device for said motors situated on the car-body.

4. The combination, with two axles of a swivel-truck, of an electric motor suspended between them and having an operative mechanical connection therewith, and a bolster carrying the king-bolt placed over said motor and supported on springs from the axles.

5. The combination, with two axles of a swivel-truck, of an electric motor suspended between them and having an operative mechanical connection therewith, and a bolster carrying the king-bolt and supported on springs at points on either side of said motor.

6. The combination, with three axles of an electrically-propelled vehicle, of two electric motors supported between them and geared to all three of the axles.

7. The combination, with three axles of an electrically-propelled vehicle, of two electric motors supported between them, a gear-wheel on each axle, and the pinions driven by the motors and actuating said wheels.

8. The combination, with an electric motor and mechanism driven thereby, of a controlling device for the motor, consisting of movable commutator-brushes, electro-magnetic actuating devices therefor, and a manual controller in the circuit of said electro-magnetic devices, whereby the motor may be controlled at the will of the operator.

9. The combination, with two electric motors having movable commutator-brushes, of an electro-magnetic brush-shifting device for each motor and a common electrical controller for said devices.

10. The combination of two electric motors in the same circuit having a common load, a controlling device for each of said motors independent of said circuit, and actuating mechanism for said devices adapted to be operated from a common point.

11. The combination of two electric motors in the same circuit having a common load, a controlling device for each motor independent of said circuit, and electro-dynamic mechanism actuating said devices and included in a common circuit.

12. The combination, with an electric motor and mechanism driven thereby, of a controlling device for the motor, consisting of movable commutator-brushes, electro-magnetic actuating devices therefor, and a manual pole-changer in the circuit of said electro-magnetic devices, whereby the motor may be controlled at the will of the operator.

13. The combination, with an electric motor, of an inclosing-case therefor having an aperture opposite the commutator of the motor, so as to permit inspection thereof, and means for controlling the motor from without the case.

14. The combination, with an electric motor, of an inclosing-case therefor having an aperture opposite the commutator of the motor, so as to permit inspection thereof, and means for controlling the sparking of the commutator from without the case.

15. The combination, with an electric motor, of an inclosing-case therefor having an aperture opposite the commutator of the motor, so as to permit inspection thereof, a glass covering the same, and means for controlling the sparking of the commutator from without the case.

16. The combination, with a car or locomotive, of a propelling electric motor therefor, an inclosing-case for said motor, and means outside said case for controlling said motor, the case having an aperture in view of the driver permitting an inspection of the commutator of the motor.

17. The combination, with a car or locomotive, of a propelling electric motor therefor, an inclosing-case for said motor, an aperture in said case, and a mirror reflecting the light from the commutator of the motor through said aperture to the eye of the driver.

18. The combination, with an electric motor, of an inclosing-case therefor, means outside of said case for controlling said motor, and a mirror reflecting the light from the commutator through an aperture in the said case to the eye of the driver.

WALTER H. KNIGHT.

Attest:
 E. M. BENTLEY,
 ALBERT E. LYNCH.